(12) United States Patent
Chen et al.

(10) Patent No.: US 8,727,687 B2
(45) Date of Patent: May 20, 2014

(54) LOCKING AND UNLOCKING NUT STRUCTURE

(76) Inventors: I-Fu Chen, Taichung (TW); Chi-Chuan Chen, Lukang Township, Changhua County (TW)

(*) Notice: Subject to any disclaimer, the term of this patent is extended or adjusted under 35 U.S.C. 154(b) by 140 days.

(21) Appl. No.: 13/459,156

(22) Filed: Apr. 28, 2012

(65) Prior Publication Data

US 2013/0287522 A1    Oct. 31, 2013

(51) Int. Cl.
*F16B 37/08*    (2006.01)
*F16B 39/02*    (2006.01)

(52) U.S. Cl.
CPC ......... *F16B 37/0821* (2013.01); *F16B 37/0864* (2013.01); *F16B 39/02* (2013.01)
USPC ............................ 411/433; 411/437; 411/273

(58) Field of Classification Search
USPC ............ 411/433, 437, 354, 272, 273; 285/89, 285/92
See application file for complete search history.

(56) References Cited

U.S. PATENT DOCUMENTS

| 2,463,179 | A | * | 3/1949 | Iftiger, Sr. ...................... 285/34 |
| 2,736,227 | A | * | 2/1956 | Stroble ......................... 411/433 |
| 5,755,544 | A | * | 5/1998 | Muller et al. .................. 411/433 |
| 5,919,018 | A | * | 7/1999 | Chuang ......................... 411/149 |
| 6,053,655 | A | * | 4/2000 | Mazhar ......................... 403/320 |
| 6,520,464 | B1 | * | 2/2003 | Morrissey et al. ....... 248/222.52 |
| 8,206,072 | B2 | * | 6/2012 | Wagner ......................... 411/433 |

* cited by examiner

*Primary Examiner* — Flemming Saether

(57) ABSTRACT

A locking and unlocking nut structure contains a body including a through hole and a semi-circular recess, and the semi-circular recess having a starting segment and a stopping segment, the body further including a diameter-decreased screw section; a slidable block including a C-shaped cutout, and the C-shaped cutout including an engaging hook extending outward from a lower end thereof, the slidable block including first threads, while the slidable block is fixed on the starting segment, a distance from the first threads to an inner wall of the through hole is larger than an outer diameter of the screw rod (tube); while the slidable block is fixed on the stopping segment, a distance from the first threads to the diameter-decreased screw section is equal to the outer diameter of the screw rod (tube); the screw rod (tube) including second threads to match with the diameter-decreased screw section and the first threads.

8 Claims, 7 Drawing Sheets

US 8,727,687 B2

LOCKING AND UNLOCKING NUT STRUCTURE

FIELD OF THE INVENTION

The present invention relates to a locking and unlocking structure which is capable of screwing with a screw rod (tube) and unscrewing from the screw rod (tube) quickly and easily.

BACKGROUND OF THE INVENTION

A conventional nut is used to screw with a screw rod (or tube), and it is fitted into a fixing position of the screw rod (tube) from a distal end of the screw rod (tube) and then is screwed with the screw rod (tube) by rotating the nut tightly.

However, it is time-consuming during rotating the nut tightly or loosely, and the longer the screw rod (tube) is, the more time consumes.

Besides, if screwing the nut with the screw rod (tube) or unscrewing the nut from the screw rod (tube) in a limited space, such as water supply device of washstand or pipeline in a machine, it is difficult to choose a suitable tool to rotate the nut in the limited space, or the use has to change operation gestures constantly, thus having inconvenient operation.

The present invention has arisen to mitigate and/or obviate the afore-described disadvantages.

SUMMARY OF THE INVENTION

The primary object of the present invention is to provide a locking and unlocking structure which is capable of screwing with a screw rod (tube) and unscrewing from the screw rod (tube) and easily.

Another primary object of the present invention is to provide a locking and unlocking structure which is capable of screwing with a screw rod (tube) and unscrewing from the screw rod (tube) and quickly to save operating time.

To obtain the above objectives, a locking and unlocking structure provided by the present invention contains:

a body including a through hole passing therethrough axially, a diameter of the through hole being larger than that of a screw rod (tube), the body also including a semi-circular recess defined on a top surface thereof, and the semi-circular recess having a starting segment defined on one end thereof and a stopping segment defined on another end thereof, the body further including a diameter-decreased screw section defined on an inner wall of the through hole thereof opposite to on an inner rim of the stopping segment of the semi-circular recess;

a slidable block including a C-shaped cutout fitted on the semi-circular recess, and the C-shaped cutout including an engaging hook extending outward from a lower end thereof so that the engaging hook retains a lower end of the body to move the slidable block between the starting segment and the stopping segment of the semi-circular recess, the slidable block including first threads defined on one of two outer surfaces thereof, while the slidable block is fixed on the starting segment of the semi-circular recess, a distance from the first threads of the slidable block to an inner wall of the through hole is larger than an outer diameter of the screw rod (tube); while the slidable block is fixed on the stopping segment of the semi-circular recess, a distance from the first threads to the diameter-decreased screw section of the through hole is equal to the outer diameter of the screw rod (tube);

the screw rod (tube) including second threads to match with the diameter-decreased screw section and the first threads of the slidable block.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
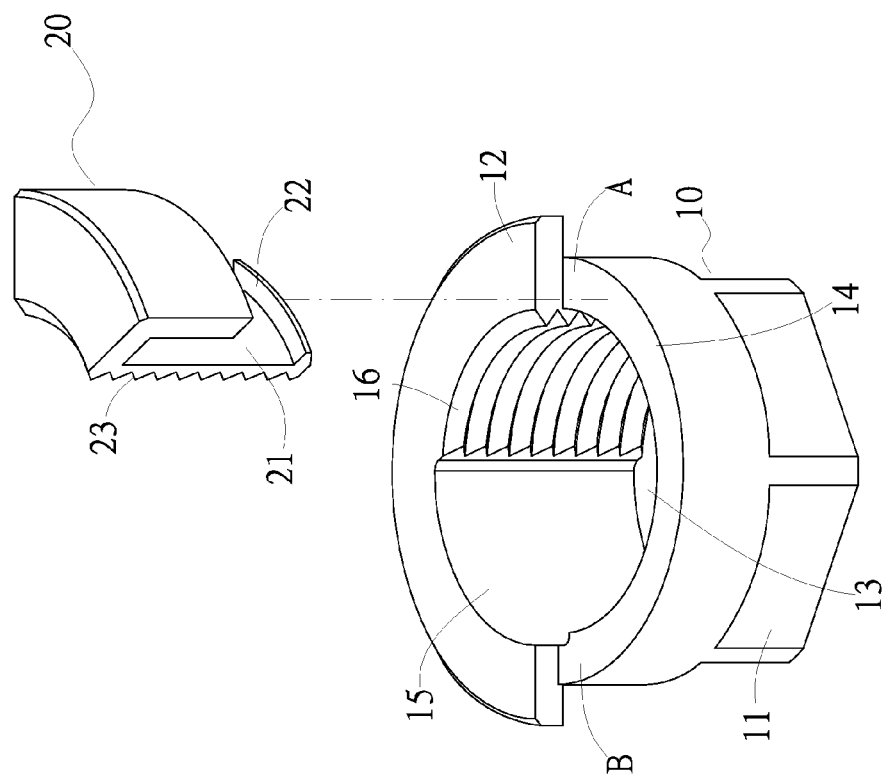
FIG. 1 is a perspective view showing the exploded components of a locking and unlocking nut structure according to a preferred embodiment of the present invention.
Figure 3:
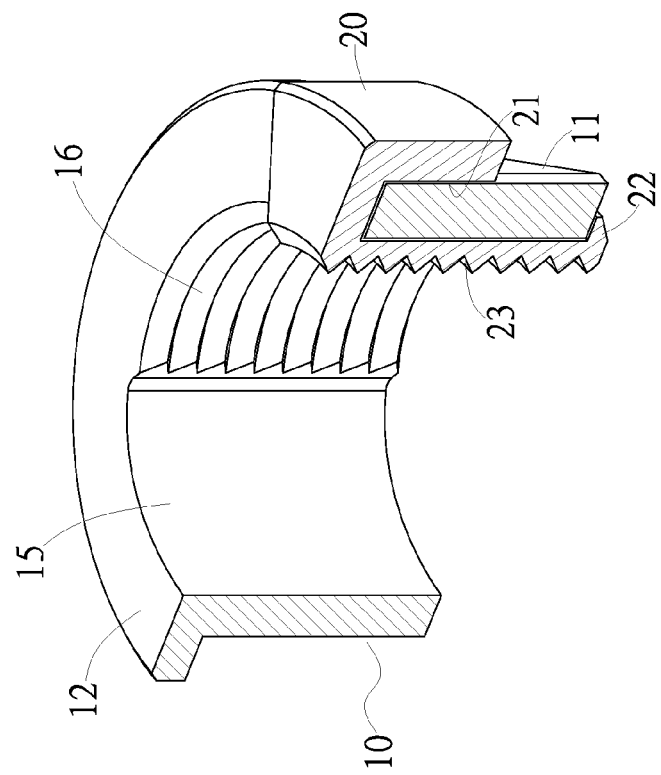
FIG. 3 is a cross-sectional perspective view showing the assembly of the locking and unlocking nut structure according to the preferred embodiment of the present invention.
Figure 2:
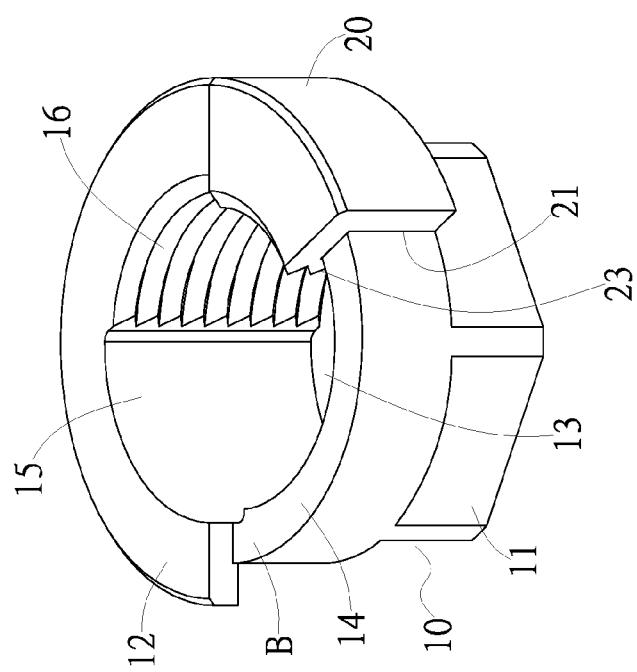
FIG. 2 is a perspective view showing the assembly of the locking and unlocking nut structure according to the preferred embodiment of the present invention.
Figure 5:
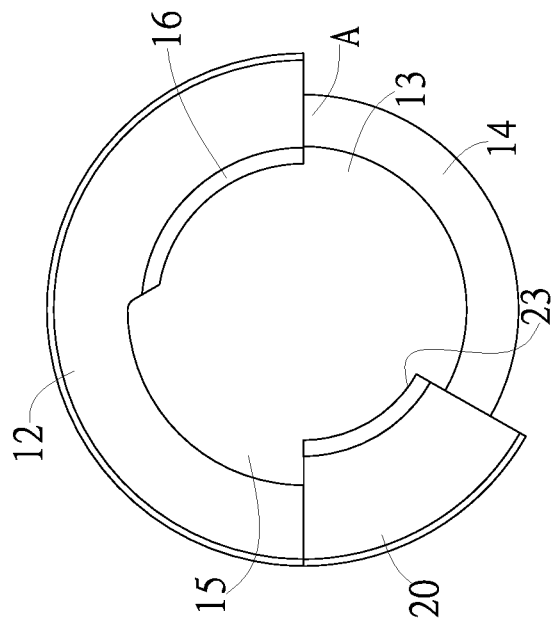
FIG. 5 is another plan view showing the assembly of the locking and unlocking nut structure according to the preferred embodiment of the present invention.
Figure 4:
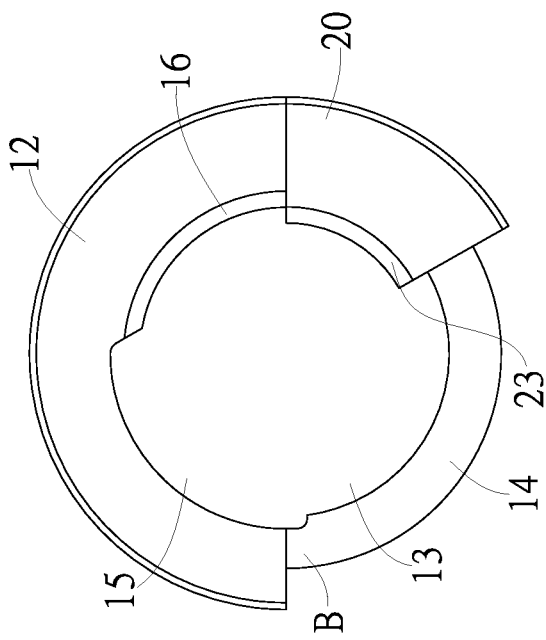
FIG. 4 is a plan view showing the assembly of the locking and unlocking nut structure according to the preferred embodiment of the present invention.
Figure 7:
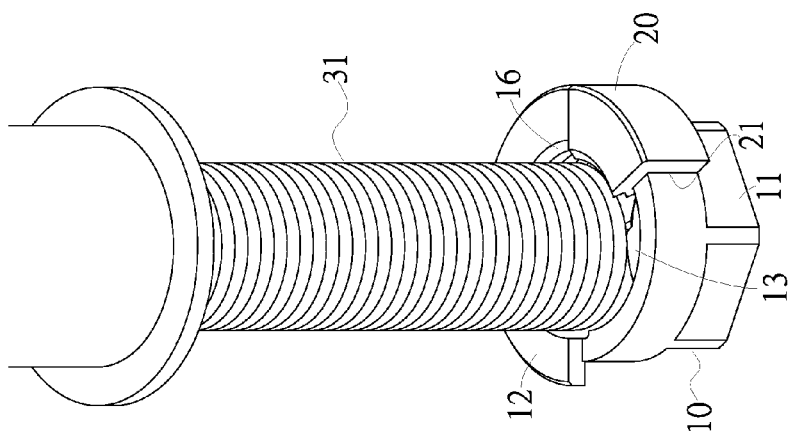
FIG. 7 is another perspective view showing the operation of the locking and unlocking nut structure according to the preferred embodiment of the present invention.
Figure 6:
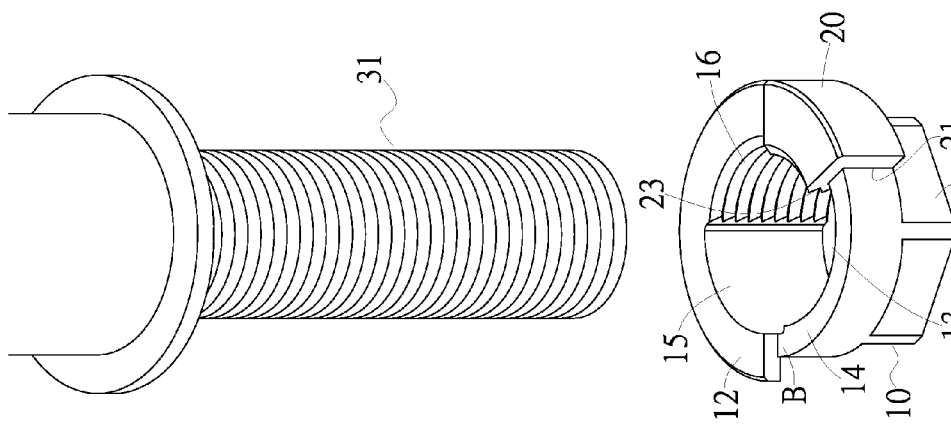
FIG. 6 is a perspective view showing the operation of the locking and unlocking nut structure according to the preferred embodiment of the present invention.
Figure 10:
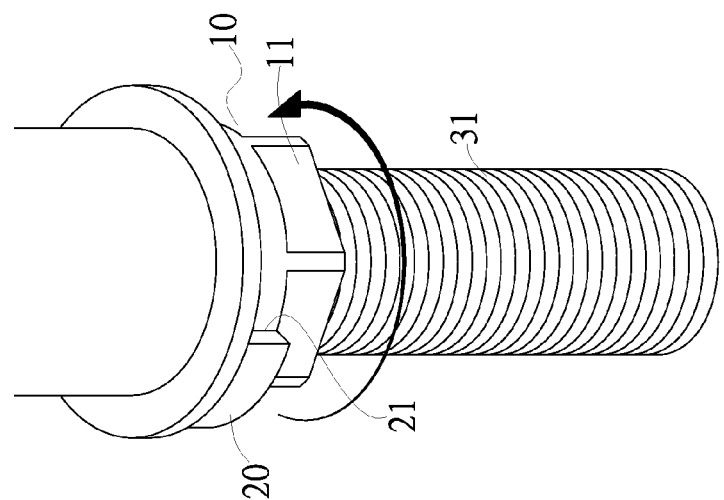
FIG. 10 is another perspective view showing the operation of the locking and unlocking nut structure according to the preferred embodiment of the present invention.
Figure 9:
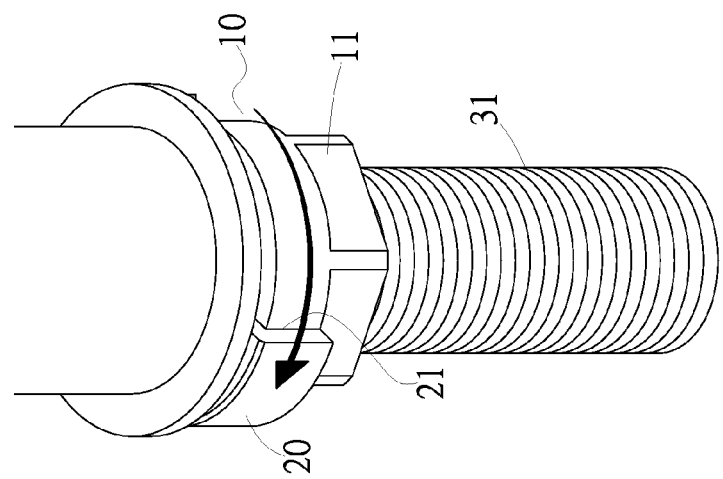
FIG. 9 is still another perspective view showing the operation of the locking and unlocking nut structure according to the preferred embodiment of the present invention.
Figure 8:
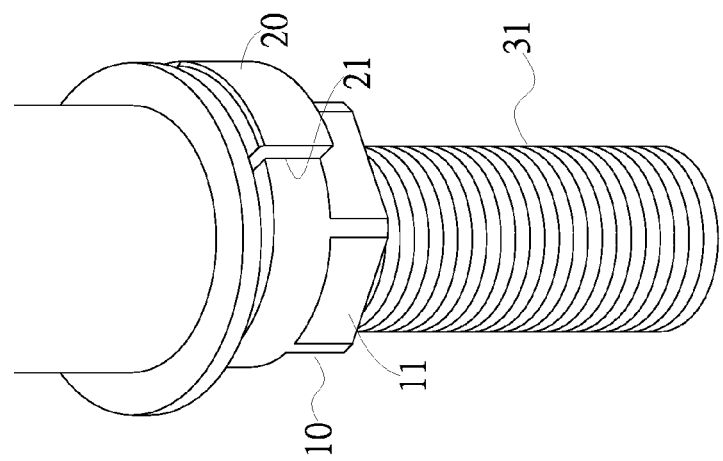
FIG. 8 is also another perspective view showing the operation of the locking and unlocking nut structure according to the preferred embodiment of the present invention.

FIG. 1 is a perspective view showing the exploded components of a locking and unlocking nut structure according to a preferred embodiment of the present invention. FIG. 2 is a perspective view showing the assembly of the locking and unlocking nut structure according to the preferred embodiment of the present invention. FIG. 3 is a cross-sectional perspective view showing the assembly of the locking and unlocking nut structure according to the preferred embodiment of the present invention. FIGS. 4 and 5 are a plan view showing the assembly of the locking and unlocking nut structure according to the preferred embodiment of the present invention. FIGS. 6-10 are a perspective view showing the operation of the locking and unlocking nut structure according to the preferred embodiment of the present invention.

Figure 12:
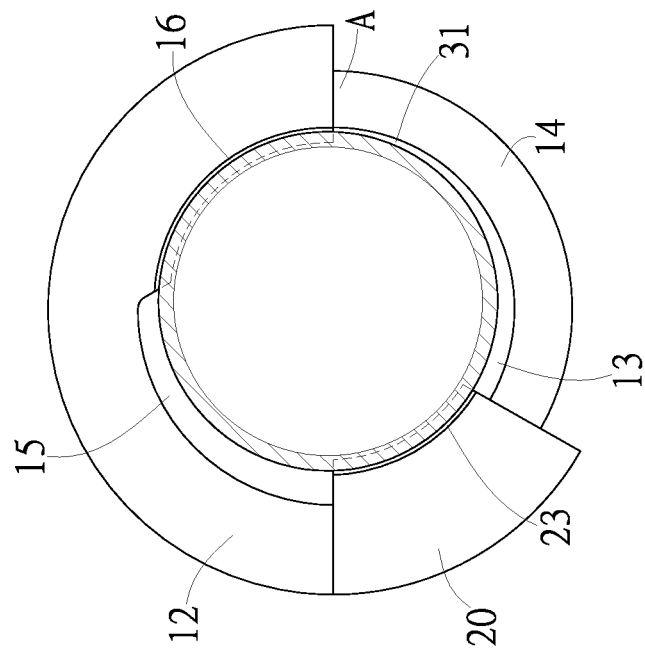
FIG. 12 is another cross sectional view showing the operation of the locking and unlocking nut structure according to the preferred embodiment of the present invention.
Figure 11:
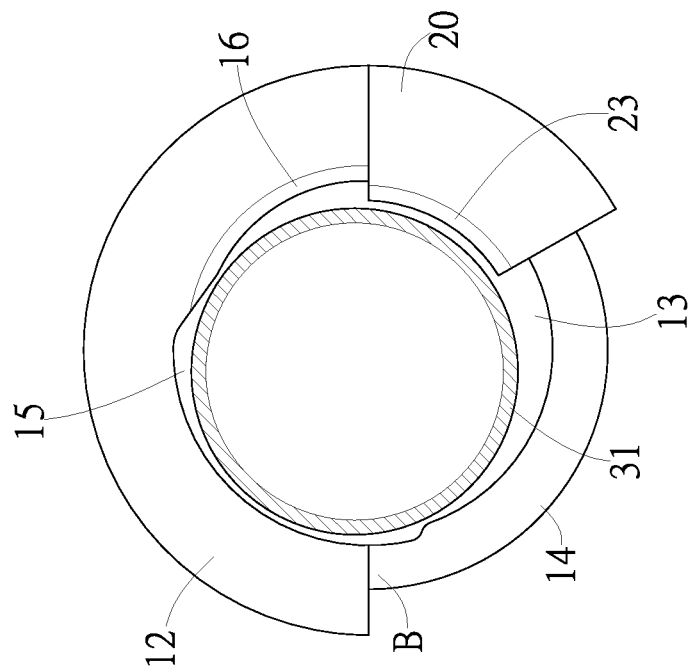
FIG. 11 is a cross sectional view showing the operation of the locking and unlocking nut structure according to the preferred embodiment of the present invention.
Figure 13:
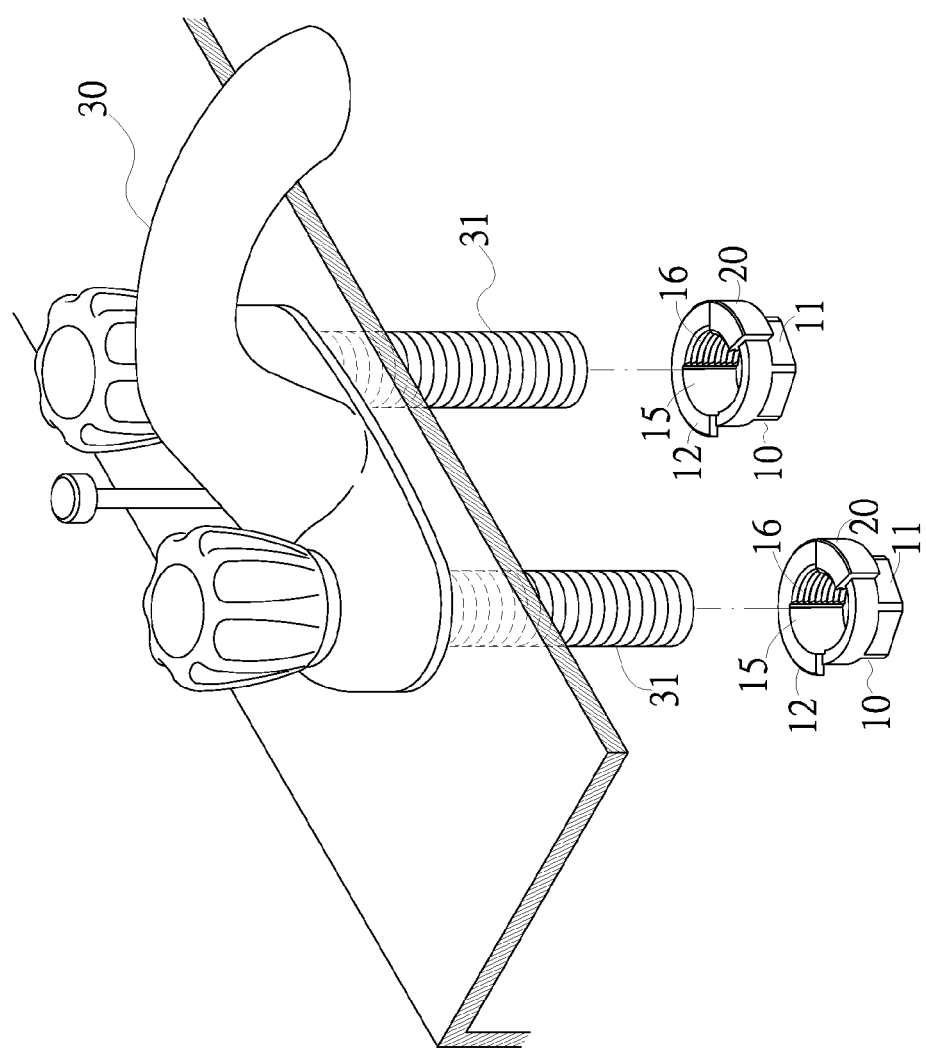
FIG. 13 is a perspective view showing the locking and unlocking nut structure of the present invention being applied in a water supply device.

FIGS. 11 and 12 are a cross sectional view showing the operation of the locking and unlocking nut structure according to the preferred embodiment of the present invention. FIG. 13 is a perspective view showing the locking and unlocking nut structure of the present invention being applied in a water supply device.

The locking and unlocking nut structure of the present invention comprises a body 10 with a predetermined size, the body 10 includes a polygonal retaining section 11 formed around a lower end thereof to be retained by a tool such that the tool retains and rotates the polygonal retaining section 11 to lock or unlock the body 10. The body 10 also includes a circular face 12 defined on a top surface thereof and a through hole 13 passing therethrough axially, wherein a diameter of the through hole 13 is larger than that of a screw rod (tube) 31 of the water supply device 30. The circular face 12 has a semi-circular recess 14 defined thereon, and the semi-circular recess 14 has a starting segment A defined on one end thereof and a stopping segment B defined on another end thereof, a top surface of the semi-circular recess 14 slopes increasingly from the starting segment A to the stopping segment B. A slidable block 20 is formed in a C shape and is retained in the semi-circular recess 14 and has a C-shaped cutout 21, a width of which is larger than that of the semi-circular recess 14 so that the C-shaped cutout 21 is fitted on the semi-circular recess 14 to move the slidable block 20 in the semi-circular recess 14. The C-shaped cutout 21 of the slidable block 20 includes an engaging hook 22 extending outward from an outer wall or an inner wall of a lower end thereof so that the engaging hook 22 retains the lower end of the body 10 to retain the slidable block 20 with the semi-circular recess 14 and to move the slidable block 20 between the starting segment A and the stopping segment B of the semi-circular recess 14. The slidable block 20 includes first threads 23 defined on one of two outer surfaces thereof to match with second threads of the screw rod (tube) 31, the body 10 also includes an increasingly arcuate section 15 defined on an inner wall of the through hole 13 thereof opposite to on an inner rim of the starting segment A of the semi-circular recess 14 or defined on the inner rim of the starting segment A of the semi-circular recess 14 so that while the slidable block 20 is fixed on the starting segment A of the semi-circular recess 14, a distance from the first threads 23 of the slidable block 20 to the arcuate section 15 of the through hole 13 is larger than an outer diameter of the screw rod (tube) 31 so as to move the screw rod (tube) 31 easily. The body 10 also includes a diameter-decreased screw section 16 defined on the inner wall of the through hole 13 thereof opposite to on an inner rim of the stopping segment B of the semi-circular recess 14 so that while the slidable block 20 is fixed on the stopping segment B of the semi-circular recess 14, a distance from the first threads 23 to the diameter-decreased screw section 16 of the through hole 13 is equal to the outer diameter of the screw rod (tube) 31.

Thereby, the slidable block 20 is moved toward different position of the semi-circular recess 14 to obtain different adjusted pitches of the through hole 13 to screw and unscrew the screw rod (tube) 31 by ways of the arcuate section 15 and the diameter-decreased screw section 16 of the through hole 13 respectively.

For example, as screwing the screw rod (tube) 31 of the water supply device with the nut structure, the slidable block 20 is pushed toward the starting segment A of the semi-circular recess 14 so that a first adjusted pitch of the through hole 13 is larger than the outer diameter of the screw rod (tube) 31, hence the screw rod (tube) 31 is fitted into the through hole 13 and is further pushed toward a screwing position, then the slidable block 20 is pushed toward the stopping segment B of the semi-circular recess 14 to match with the top surface of the semi-circular recess 14 which slopes increasingly from the starting segment A to the stopping segment B so that the first threads 23 of the slidable block 20 and the diameter-decreased screw section 16 retain with the second threads of the screw rod (tube) 31, thereafter the tool (not shown) retains the polygonal retaining section 11 of the body 10 to screw the nut structure so that the nut structure locks the screw rod (tube) 31 securely, thus locking the water supply device 30.

As unscrewing the nut structure from the screw rod (tube) 31 of the water supply device, the tool (not shown) retains the polygonal retaining section 11 of the body 10 and rotates the polygonal retaining section 11 releasably so that the slidable block 20 is pushed toward the starting segment A from the stopping segment B to unscrew the nut structure from the screw rod (tube) 31, hence the nut structure is unlocked from the screw rod (tube) 31 quickly to unlock the water supply device 30 further.

Thereby, the nut structure of the present invention is capable of locking the screw rod (tube) with the water supply device and unlocking the screw rod (tube) from the water supply device quickly and easily in a limited operation space.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A locking and unlocking nut structure comprising:
a body including a through hole passing therethrough axially, a diameter of the through hole being larger than that of a screw rod, the body also including a semi-circular recess defined on a top surface thereof, and the semi-circular recess having a starting segment defined on one end thereof and a stopping segment defined on another end thereof, the body further including a diameter-decreased screw section defined on an inner wall of the through hole thereof opposite to on an inner rim of the stopping segment of the semi-circular recess;
a slidable block including a C-shaped cutout fitted on the semi-circular recess, and the C-shaped cutout including an engaging hook extending outward from a lower end thereof so that the engaging hook retains a lower end of the body to move the slidable block between the starting segment and the stopping segment of the semi-circular recess, the slidable block including first threads defined on one of two outer surfaces thereof, while the slidable block is fixed on the starting segment of the semi-circular recess, a distance from the first threads of the slidable block to an inner wall of the through hole is larger than an outer diameter of the screw rod; while the slidable block is fixed on the stopping segment of the semi-circular recess, a distance from the first threads to the diameter-decreased screw section of the through hole is equal to the outer diameter of the screw rod;
the screw rod including second threads to match with the diameter-decreased screw section and the first threads of the slidable block.

2. The locking and unlocking nut as claimed in claim 1, wherein the body also includes an increasingly arcuate section defined on the inner wall of the through hole thereof opposite to on an inner rim of the starting segment of the semi-circular recess.

3. The locking and unlocking nut as claimed in claim 1, wherein the body also includes an increasingly arcuate section defined on the inner rim of the starting segment of the semi-circular recess.

4. The locking and unlocking nut as claimed in claim 1, wherein the engaging hook extends outward from an inner wall of the lower end of the C-shaped cutout.

5. The locking and unlocking nut as claimed in claim 1, wherein the engaging hook extends outward from an outer wall of the lower end of the C-shaped cutout.

6. The locking and unlocking nut as claimed in claim 1, wherein the body includes a polygonal retaining section formed around the lower end thereof to be retained by a tool.

7. The locking and unlocking nut as claimed in claim 1, wherein the body also includes a circular face defined on the top surface thereof, and the circular face has the semi-circular recess defined thereon.

8. The locking and unlocking nut as claimed in claim 1, wherein a top surface of the semi-circular recess slopes increasingly from the starting segment to the stopping segment, wherein the bottom of the body also slopes increasingly from a point corresponding to the starting segment to a point the stopping segment, and wherein the slope of the bottom of the body is parallel to the slope of the top surface of the semi-circular recess.

\* \* \* \* \*